(12) United States Patent
Kikuchi et al.

(10) Patent No.: US 10,421,860 B2
(45) Date of Patent: Sep. 24, 2019

(54) THERMOPLASTIC RESIN COMPOSITION AND MOLDED BODY COMPRISING THE SAME

(71) Applicant: Mitsubishi Gas Chemical Company, Inc., Tokyo (JP)

(72) Inventors: Mayumi Kikuchi, Kanagawa (JP); Tomonori Kato, Kanagawa (JP); Kazuya Sato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 11 days.

(21) Appl. No.: 15/538,913

(22) PCT Filed: Dec. 17, 2015

(86) PCT No.: PCT/JP2015/085369
§ 371 (c)(1),
(2) Date: Jun. 22, 2017

(87) PCT Pub. No.: WO2016/104327
PCT Pub. Date: Jun. 30, 2016

(65) Prior Publication Data
US 2017/0342269 A1    Nov. 30, 2017

(30) Foreign Application Priority Data
Dec. 26, 2014    (JP) ................ 2014-263889

(51) Int. Cl.
| | |
|---|---|
| C08L 77/06 | (2006.01) |
| C08J 3/20 | (2006.01) |
| C08L 23/26 | (2006.01) |
| C08L 77/02 | (2006.01) |
| C08L 101/00 | (2006.01) |
| C08J 5/18 | (2006.01) |
| C08L 77/00 | (2006.01) |

(52) U.S. Cl.
CPC ............ *C08L 77/06* (2013.01); *C08J 3/20* (2013.01); *C08J 5/18* (2013.01); *C08L 23/26* (2013.01); *C08L 77/00* (2013.01); *C08L 77/02* (2013.01); *C08L 101/00* (2013.01); *C08J 2377/00* (2013.01); *C08J 2377/06* (2013.01); *C08J 2451/06* (2013.01); *C08J 2477/00* (2013.01); *C08J 2477/06* (2013.01); *C08L 2203/16* (2013.01); *C08L 2205/02* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 2013/0056107 A1 | 3/2013 | Oyaizu et al. | |
| 2013/0068335 A1 | 3/2013 | Oyaizu et al. | |
| 2013/0123439 A1 | 5/2013 | Mitadera et al. | |
| 2015/0056393 A1 | 2/2015 | Mizutani et al. | |

FOREIGN PATENT DOCUMENTS

| | | |
|---|---|---|
| JP | 2007-126591 A | 5/2007 |
| JP | 2008-088377 A | 4/2008 |
| JP | 2008-133455 A | 6/2008 |
| JP | 2008-239842 A | 10/2008 |
| JP | 2009-007384 A | 1/2009 |
| JP | 2011-105822 A | 6/2011 |
| JP | 2012-177006 A | 9/2012 |
| JP | 2014-065802 A | 4/2014 |
| WO | 2005/097903 A1 | 10/2005 |
| WO | 2007/046541 A1 | 4/2007 |
| WO | 2012/169334 A1 | 12/2012 |
| WO | 2013/038576 A1 | 3/2013 |

OTHER PUBLICATIONS

International Search Report dated Mar. 22, 2016, for PCT/JP2015/085369 and English translation of the same (5 pages).

*Primary Examiner* — Ana L. Woodward
(74) *Attorney, Agent, or Firm* — Fitch, Even, Tabin & Flannery LLP

(57) ABSTRACT

The present invention relates to a thermoplastic resin composition, which achieves barrier properties against various types of gases, while maintaining flexibility, and a molded body comprising the same. The thermoplastic resin composition of the present invention is characterized in that it comprises an aliphatic polyamide, a semi-aromatic polyamide, and an impact modifier, wherein at least a part of the impact modifier is dispersed in the semi-aromatic polyamide, in the semi-aromatic polyamide, the molar ratio between diamine units and dicarboxylic acid units (the number of moles of diamine units/the number of moles of dicarboxylic acid units) is in the range of 0.97 to 1.02, and the mass ratio of the impact modifier to the total mass of the semi-aromatic polyamide and the impact modifier is in the range of 5% to 15%.

11 Claims, No Drawings

THERMOPLASTIC RESIN COMPOSITION AND MOLDED BODY COMPRISING THE SAME

CROSS-REFERENCE TO RELATED APPLICATIONS

This application is a U.S. national phase application filed under 35 U.S.C. § 371 of International Application PCT/JP2015/085369, filed on Dec. 17, 2015, designating the United States, which claims priority from Japanese Application Number 2014-263889, filed Dec. 26, 2014, which are hereby incorporated herein by reference in their entirety.

FIELD OF THE INVENTION

The present invention relates to a thermoplastic resin composition and a molded body comprising the same. More specifically, the present invention relates to a thermoplastic resin composition, which is excellent in terms of flexibility and gas barrier properties and is preferably used as a fuel transportation piping material or a fuel storage container, and a molded body comprising the same.

BACKGROUND OF THE INVENTION

Conventionally, since aliphatic polyamides, such as polyamide 11 and polyamide 12, are excellent in terms of chemical resistance, these polyamides have been widely used as materials for various types of films and hollow molded bodies, such as a hose, a tube, and a pipe, which have been used for fuel transportation, fuel storage or the like. Films and hollow molded bodies used for these intended uses are required to have high gas barrier properties, in order to suppress permeation of volatile components such as volatile hydrocarbon through these films or hollow molded bodies, and diffusion thereof in the air.

However, although molded bodies formed from aliphatic polyamides, and in particular, from polyamide 11 or polyamide 12, are excellent in terms of toughness, chemical resistance and flexibility, they do not have sufficient barrier properties against various types of gases such as oxygen and volatile hydrocarbon. Accordingly, it has been desired to improve the gas barrier properties of them.

As a means for enhancing the gas barrier properties of a molded body, a method of blending a semi-aromatic polyamide in addition to polyamide 11 or polyamide 12 has been proposed (Patent Literature 1: JP Patent Publication (Kokai) No. 2008-133455 A). However, this method has been problematic in that flexibility becomes insufficient, depending on the amount of a semi-aromatic polyamide added.

CITATION LIST

Patent Literature

Patent Literature 1: JP Patent Publication (Kokai) No. 2008-133455 A

SUMMARY OF INVENTION

Under such circumstances, it has been desired to provide a thermoplastic resin composition, which achieves barrier properties against various types of gases such as oxygen and volatile hydrocarbon, while maintaining flexibility, and is preferably used as a fuel transportation piping material, a fuel storage container or the like, and a molded body comprising the same.

As a result of intensive studies in view of the aforementioned problem, the present inventors have found that a thermoplastic resin composition comprising an aliphatic polyamide (A), a semi-aromatic polyamide (B), and an impact modifier (C), wherein at least a part of the impact modifier (C) is dispersed in the semi-aromatic polyamide (B), and the molar ratio between diamine units and dicarboxylic acid units (diamine units/dicarboxylic acid units) in the semi-aromatic polyamide (B) and the mass ratio of the impact modifier (C) to the total mass of the semi-aromatic polyamide (B) and the impact modifier (C) are within the predetermined ranges, can achieve both flexibility and gas barrier properties at high levels, thereby completing the present invention.

Specifically, the present invention relates to the following thermoplastic resin composition and a molded body comprising the same.

[1] A thermoplastic resin composition comprising an aliphatic polyamide (A), a semi-aromatic polyamide (B), and an impact modifier (C), wherein at least a part of the impact modifier (C) is dispersed in the semi-aromatic polyamide (B), wherein the aliphatic polyamide (A) is at least one selected from the group consisting of: a polyamide (A1) comprising at least one of lactam-derived constituting units having 10 to 12 carbon atoms and aminocarboxylic acid-derived constituting units having 10 to 12 carbon atoms; and a polyamide (A2) comprising aliphatic diamine-derived constituting units having 6 to 12 carbon atoms and aliphatic dicarboxylic acid-derived constituting units having 10 to 12 carbon atoms, in the semi-aromatic polyamide (B), the molar ratio between diamine units and dicarboxylic acid units (the number of moles of diamine units/the number of moles of dicarboxylic acid units) is in the range of 0.97 to 1.02, and the mass ratio of the impact modifier (C) to the total mass of the semi-aromatic polyamide (B) and the impact modifier (C) is in the range of 5% to 15%.

[2] The thermoplastic resin composition according to the above [1], wherein the mass ratio of the impact modifier (C) dispersed in the semi-aromatic polyamide (B) to the total mass of the semi-aromatic polyamide (B) and the impact modifier (C) is in the range of 5% to 15%.

[3] The thermoplastic resin composition according to the above [1] or [2], wherein the mass ratio between the aliphatic polyamide (A) and the semi-aromatic polyamide (B) (the mass of the aliphatic polyamide (A):the mass of the semi-aromatic polyamide (B)) is in the range of 15:85 to 85:15.

[4] The thermoplastic resin composition according to any one of the above [1] to [3], wherein the semi-aromatic polyamide (B) is a polyamide comprising diamine constituting units containing 70 mol % or more of diamine constituting units derived from m-xylylenediamine, and dicarboxylic acid units containing 70 mol % or more of dicarboxylic acid units derived from α,ω-straight chain aliphatic dicarboxylic acid having 4 to 8 carbon atoms.

[5] The thermoplastic resin composition according to any one of the above [1] to [4], wherein the aliphatic polyamide (A) is one or more selected from the group consisting of polyamide 11, polyamide 12, polyamide 10,10, polyamide 10,12, polyamide 6,11 and polyamide 6,12.

[6] The thermoplastic resin composition according to any one of the above [1] to [5], wherein the impact modifier (C) is modified by acid.

[7] The thermoplastic resin composition according to any one of the above [1] to [6], wherein the ratio of the weight of the impact modifier (C) dispersed in the semi-aromatic polyamide (B) (W(C, B)) to the weight of the impact modifier (C) dispersed in the aliphatic polyamide (A) (W(C, A)), (W(C, B)/W(C, A)), is greater than the ratio of the weight of the semi-aromatic polyamide (B) (W(B)) to the weight of the aliphatic polyamide (A) (W(A)), (W(B)/W(A)), (W(C, B)/W(C, A)>W(B)/W(A)).

[8] The thermoplastic resin composition according to any one of the above [1] to [7], which is obtained by melt-kneading the aliphatic polyamide (A) and a resin composition (D) that has been obtained by previously melt-kneading the semi-aromatic polyamide (B) and the impact modifier (C).

[9] The thermoplastic resin composition according to the above [8], wherein the melt viscosity of the resin composition (D) at 260° C. at a shear rate of 100/s is in the range of 50 to 2000 Pa·s.

[10] A molded body comprising the thermoplastic resin composition according to any one of the above [1] to [9].

[11] The molded body according to the above [10], which is a hollow molded body, a film-like molded body, or a fiber.

[12] The molded body according to the above [11], wherein the hollow molded body is a fuel tube, a fuel pipe, a fuel hose, or a connector.

According to the present invention, a thermoplastic resin composition having flexibility and gas barrier properties and a molded body comprising the same are obtained. According to a preferred aspect of the present invention, the thermoplastic resin composition of the present invention and a molded body comprising the same are preferably used as materials for a fuel transportation piping material, a fuel storage container, and the like.

DESCRIPTION OF EMBODIMENTS

Hereinafter, preferred embodiments of the thermoplastic resin composition of the present invention and a molded body comprising the same will be specifically described.

1. Thermoplastic Resin Composition

The thermoplastic resin composition of the present invention is characterized in that it comprises an aliphatic polyamide (A), a semi-aromatic polyamide (B), and an impact modifier (C), wherein at least a part of the impact modifier (C) is dispersed in the semi-aromatic polyamide (B), wherein, the aliphatic polyamide (A) is at least one selected from the group consisting of: a polyamide (A1) comprising at least one of lactam-derived constituting units having 10 to 12 carbon atoms and aminocarboxylic acid-derived constituting units having 10 to 12 carbon atoms; and a polyamide (A2) comprising aliphatic diamine-derived constituting units having 6 to 12 carbon atoms and aliphatic dicarboxylic acid-derived constituting units having 10 to 12 carbon atoms, in the semi-aromatic polyamide (B), the molar ratio between diamine units and dicarboxylic acid units (the number of moles of diamine units/the number of moles of dicarboxylic acid units) is in the range of 0.97 to 1.02, and the mass ratio of the impact modifier (C) to the total mass of the semi-aromatic polyamide (B) and the impact modifier (C) is in the range of 5% to 15%.

In the thermoplastic resin composition of the present invention, since at least a part of the impact modifier (C) is dispersed in the semi-aromatic polyamide (B), the effects can be effectively obtained by addition of the impact modifier, and the semi-aromatic polyamide (B) having high gas barrier properties can be mixed at a desired amount ratio into the present thermoplastic resin composition, without impairing flexibility.

In the present invention, it may be adequate if at least a part of the impact modifier (C) is dispersed in the semi-aromatic polyamide (B), and the amount of the impact modifier (C) dispersed in the semi-aromatic polyamide (B) is not particularly limited. In a case where the ratio of the mass of the impact modifier (C) dispersed in the semi-aromatic polyamide (B) to the total mass of the semi-aromatic polyamide (B) and the impact modifier (C) is in the range of 5% to 15%, a material having higher flexibility can be preferably obtained. The mass ratio of the impact modifier (C) dispersed in the semi-aromatic polyamide (B) can be adjusted based on the amount ratio between the aliphatic polyamide (A) and the semi-aromatic polyamide (B) used as matrix resins, or by previously blending the impact modifier (C) with the semi-aromatic polyamide (B) at a desired amount ratio and then blending the obtained mixture with other components such as the aliphatic polyamide (A). Hereinafter, individual components used in the thermoplastic resin composition of the present invention will be described.

(1) Aliphatic Polyamide (A)

The aliphatic polyamide (A) used in the thermoplastic resin composition of the present invention is one or two or more selected from the group consisting of: a polyamide (A1) comprising at least one of lactam-derived constituting units having 10 to 12 carbon atoms and aminocarboxylic acid-derived constituting units having 10 to 12 carbon atoms; and a polyamide (A2) comprising aliphatic diamine-derived constituting units having 6 to 12 carbon atoms and aliphatic dicarboxylic acid-derived constituting units having 10 to 12 carbon atoms. Hereafter, the polyamides (A1) and (A2) will be described.

[Polyamide (A1)]

The polyamide (A1) comprises at least one of lactam-derived constituting units having 10 to 12 carbon atoms and aminocarboxylic acid-derived constituting units having 10 to 12 carbon atoms.

The number of carbon atoms contained in such lactam-derived constituting units and aminocarboxylic acid-derived constituting units is preferably 11 or 12, from the viewpoint of flexibility, easy availability and the like.

The lactam-derived constituting unit having 10 to 12 carbon atoms and the aminocarboxylic acid-derived constituting unit having 10 to 12 carbon atoms generally consist of a ω-aminocarboxylic acid unit represented by the following general formula (A-1):

[Formula 1]

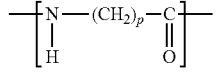

(A-1)

wherein, in the above formula, p represents an integer of 9 to 11, and preferably 10 or 11.

Specific examples of a compound constituting the lactam-derived constituting unit having 10 to 12 carbon atoms include decanelactam, undecanelactam, and dodecanelactam. On the other hand, specific examples of a compound constituting the aminocarboxylic acid-derived constituting unit having 10 to 12 carbon atoms include 10-aminodecanoic acid, 11-aminoundecanoic acid, and 12-aminododecanoic acid.

The polyamide (A1) is not limited to a polyamide (A1) consisting of only constituting units derived from lactam having 10 to 12 carbon atoms and aminocarboxylic acid having 10 to 12 carbon atoms, as long as it comprises, as a main component, these constituting units. It is to be noted that the expression "as a main component" is used herein to mean that other constituting units may also be comprised, unless such other constituting units impair the effects of the present invention. Thus, at least one of the lactam constituting units having 10 to 12 carbon atoms and the aminocarboxylic acid-derived constituting units having 10 to 12 carbon atoms, as monomers, accounts for, for example, 60 mol % or more, preferably 80 to 100 mol %, and more preferably 90 to 100 mol %, of all constituting units in the polyamide (A1), although it is not particularly limited thereto.

Examples of other constituting units in the polyamide (A1) include lactams other than the lactam having 10 to 12 carbon atoms, aminocarboxylic acids other than the aminocarboxylic acid having 10 to 12 carbon atoms, and constituting units derived from nylon salts consisting of diamine and dicarboxylic acid.

Examples of such lactams other than the lactam having 10 to 12 carbon atoms include lactams having a 3- or more-membered ring. Specific examples include ε-caprolactam, ω-enantholactam, α-pyrrolidone, and α-piperidone. Examples of aminocarboxylic acids other than the aminocarboxylic acid having 10 to 12 carbon atoms include 6-aminocaproic acid, 7-aminoheptanoic acid, and 9-aminononanoic acid.

Examples of the diamine constituting nylon salts include: aliphatic diamines such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, and 2,2,4- or 2,4,4-trimethylhexanediamine; alicyclic diamines such as 1,3- or 1,4-cyclohexanediamine, 1,3- or 1,4-bis(aminomethyl)cyclohexane, bis(4-aminocyclohexyl)methane, 2,2-bis(4-aminocyclohexyl)propane, bis (3-methyl-4-aminocyclohexyl)methane, 2,2-bis (3-methyl-4-aminocyclohexyl)propane, 5-amino-2,2,4-trimethylcyclopentanemethanamine, 5-amino-1,3,3-trimethylcyclohexanemethanamine, bis(aminopropyl)piperazine, bis (aminoethyl)piperazine, norbornanedimethylamine, and tricyclodecanedimethylamine; and diamines having an aromatic ring, such as p-xylylenediamine and m-xylylenediamine.

Examples of the dicarboxylic acid constituting nylon salts include: aliphatic dicarboxylic acids such as adipic acid, pimelic acid, suberic acid, azelaic acid, sebacic acid, 1,9-nonanedicarboxylic acid, 1,10-decanedicarboxylic acid, 1,11-undecanedicarboxylic acid, and 1,12-dodecanedicarboxylic acid; alicyclic dicarboxylic acids such as 1,3- or 1,4-cyclohexanedicarboxylic acid, dicyclohexanemethane-4,4'-dicarboxylic acid, and norbornanedicarboxylic acid; and aromatic dicarboxylic acids such as isophthalic acid, terephthalic acid, and 1,4-, 2,6- or 2,7-naphthalenedicarboxylic acid.

The polyamide (A1) is preferably polyamide 11 comprising at least one of undecanelactam-derived constituting units and 11-aminoundecanoic acid-derived constituting units as a main component, or polyamide 12 comprising at least one of dodecanelactam-derived constituting units and 12-aminododecanoic acid-derived constituting units as a main component, or a mixture of the polyamide 11 and the polyamide 12.

The polyamide (A1) can be obtained by polymerizing the above-described constituting monomers. That is, the polyamide (A1) is obtained by subjecting lactam to ring-opening polymerization or by subjecting aminocarboxylic acid to polycondensation.

The polymerization method is not particularly limited, and a known method such as melt polymerization, solution polymerization or solid phase polymerization can be adopted. These polymerization methods can be used alone, or by appropriately combining them. As a production apparatus, a known polyamide production apparatus, such as a batch-type reaction tank, a single-tank or multi-tank continuous reactor, a tubular continuous reactor, a uniaxial kneading extruder, or a biaxial kneading extruder, can be used.

Upon the polycondensation of the polyamide (A1), a small amount of monoamine, monocarboxylic acid, etc. may be added as a molecular weight adjuster.

Moreover, upon the polycondensation of the polyamide (A1), in order to obtain the effect of promoting an amidation reaction or the effect of preventing coloration during the polycondensation, known additives such as a phosphorus atom-containing compound, an alkaline metal compound and an alkaline-earth metal compound may be added.

From the viewpoint of heat resistance and melt moldability, the melting point Tm of the polyamide (A1) is preferably 160° C. to 240° C., more preferably 165° C. to 230° C., and further preferably 170° C. to 220° C.

It is to be noted that, in the present description, the melting point is measured by performing DSC measurement (differential scanning calorimetry) using a differential scanning calorimeter [manufactured by Shimadzu Corporation, trade name: DSC-60], at a temperature increase rate of 10° C./min under a nitrogen current.

[Polyamide (A2)]

The polyamide (A2) comprises aliphatic diamine-derived constituting units having 6 to 12 carbon atoms and aliphatic dicarboxylic acid-derived constituting units having 10 to 12 carbon atoms.

The compound capable of constituting the diamine unit of the polyamide (A2) is an aliphatic diamine having 6 to 12 carbon atoms. The aliphatic group in the aliphatic diamine having 6 to 12 carbon atoms is a linear or branched divalent aliphatic hydrocarbon group, which may be either a saturated aliphatic group or an unsaturated aliphatic group. In general, it is a linear saturated aliphatic group. The number of carbon atoms contained in the aliphatic group is preferably 8 to 12, more preferably 9 to 12, and further preferably 10 to 12.

Examples of the compound capable of constituting the diamine unit of the polyamide (A2) include aliphatic diamines such as hexamethylenediamine, heptamethylenediamine, octamethylenediamine, nonamethylenediamine, decamethylenediamine, undecamethylenediamine, and dodecamethylenediamine, but are not limited thereto. These compounds can be used alone, or in combination of two or more types.

From the viewpoint of flexibility and the like, the diamine units in the polyamide (A2) comprise aliphatic diamine-derived constituting units having 6 to 12 carbon atoms in an amount of preferably 70 mol % or more, more preferably 80 to 100 mol %, and further preferably 90 to 100 mol %.

Thus, the diamine units in the polyamide (A2) may consist of only the aliphatic diamine-derived constituting units having 6 to 12 carbon atoms, but the diamine units may also comprise constituting units derived from diamines other than the aliphatic diamine having 6 to 12 carbon atoms.

Examples of diamines other than the aliphatic diamine having 6 to 12 carbon atoms, which are comprised in the polyamide (A2), include: aliphatic diamines such as ethylenediamine, propylenediamine, tetramethylenediamine, and pentamethylenediamine; alicyclic diamines such as 1,3- or 1,4-bis(aminomethyl)cyclohexane, 1,3- or 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, paraphenylenediamine, and bis(aminomethyl)naphthalene, but the examples are not limited thereto.

The compound capable of constituting the dicarboxylic acid unit in the polyamide (A2) is an aliphatic dicarboxylic acid having 10 to 12 carbon atoms, and specific examples include sebacic acid, 1,9-nonanedicarboxylic acid, and 1,10-decanedicarboxylic acid. These compounds can be used alone, or in combination of two or more types.

From the viewpoint of achieving better flexibility, the dicarboxylic acid units in the polyamide (A2) comprise aliphatic dicarboxylic acid-derived constituting units having 10 to 12 carbon atoms in an amount of preferably 70 mol % or more, more preferably 80 to 100 mol %, and further preferably 90 to 100 mol %.

Thus, the dicarboxylic acid units in the polyamide (A2) may consist of only the aliphatic dicarboxylic acid-derived constituting units having 10 to 12 carbon atoms, but may also comprise constituting units derived from dicarboxylic acids other than the aliphatic dicarboxylic acid having 10 to 12 carbon atoms.

Examples of dicarboxylic acids other than the aliphatic dicarboxylic acid having 10 to 12 carbon atoms, which are comprised in the polyamide (A2), include: aliphatic carboxylic acids having 9 or less and 13 or more carbon atoms, such as succinic acid, glutaric acid, adipic acid, pimelic acid, suberic acid, azelaic acid, 1,11-undecanedicarboxylic acid, 1,12-dodecanedicarboxylic acid, 1,13-tridecanedicarboxylic acid, and 1,14-tetradecanedicarboxylic acid; and aromatic dicarboxylic acids such as terephthalic acid, isophthalic acid, and 2,6-naphthalenedicarboxylic acid, but the examples are not limited thereto.

From the viewpoint of the improvement of flexibility, the polyamide (A2) is preferably a polyamide comprising, as a main component, aliphatic diamine-derived constituting units having 10 or more carbon atoms, and examples of such a polyamide include polyamide 10,10, polyamide 10,12, polyamide 6,11, and polyamide 6,12. More preferred examples include: polyamide 10,10 comprising, as main components, both aliphatic diamine-derived constituting units having 10 carbon atoms and aliphatic dicarboxylic acid-derived constituting units having 10 carbon atoms; polyamide 10,12 comprising, as main components, both aliphatic diamine-derived constituting units having 10 carbon atoms and aliphatic dicarboxylic acid-derived constituting units having 12 carbon atoms; and a mixture thereof.

The polyamide (A2) is obtained by polycondensation of diamine components and dicarboxylic acid components. For example, a polyamide can be produced by a method which comprises increasing the temperature of salts consisting of diamine components and dicarboxylic acid components in the presence of water under pressurized conditions, and polymerizing them in a melted state, while removing the added water and condensation water. Alternatively, a polyamide can also be produced by a method which comprises directly adding diamine components to melted dicarboxylic acid components, and performing polycondensation under an ordinary pressure. In this case, in order to maintain the reaction system in a homogenous solution state, diamine components are continuously added to dicarboxylic acid components, and during this operation, the temperature of the reaction system is increased so that the reaction temperature cannot be lower than the melting point of the generated oligoamide and polyamide, and polycondensation is progressed.

Upon the polycondensation of the polyamide (A2), a small amount of monoamine, monocarboxylic acid, etc. may be added as a molecular weight adjuster.

Moreover, upon the polycondensation of the polyamide (A2), in order to obtain the effect of promoting an amidation reaction or the effect of preventing coloration during the polycondensation, known additives such as a phosphorus atom-containing compound, an alkaline metal compound and an alkaline-earth metal compound may be added.

From the viewpoint of heat resistance and melt moldability, the melting point Tm of the polyamide (A2) is preferably 160° C. to 240° C., more preferably 165° C. to 230° C., and further preferably 170° C. to 220° C.

Among these compounds, as an aliphatic polyamide (A) used in the thermoplastic resin composition of the present invention, any one or more selected from the group consisting of polyamide 11, polyamide 12, polyamide 10,10, polyamide 10,12, polyamide 6,11 and polyamide 6,12 is preferable, and further, poly amide 11, poly amide 12, or a mixture thereof is more preferable.

(2) Semi-aromatic Polyamide (B)

The semi-aromatic polyamide (B) used in the thermoplastic resin composition of the present invention means a resin comprising diamine constituting units and dicarboxylic acid constituting units, wherein either the diamine constituting units or the dicarboxylic acid constituting units comprise more than 50 mol % of constituting units derived from aromatic compounds. Examples of the semi-aromatic polyamide (B) preferably used in the present invention include: a polyamide (B1) having diamine units containing 50 mol % or more of aromatic diamine units represented by the following general formula (I), and dicarboxylic acid units containing 50 mol % or more of α,ω-linear aliphatic dicarboxylic acid units represented by the following general formula (II); and a polyamide (B2) having diamine units containing 50 mol % or more of aliphatic diamine units represented by the following general formula (III), and dicarboxylic acid units containing 50 mol % or more of aromatic dicarboxylic acid units represented by the following general formula (IV). These polyamides may be used alone, or in combination of two or more types.

[Formula 2]

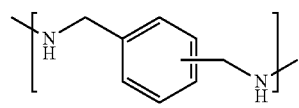

(I)

-continued

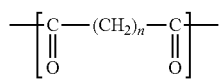
(II)

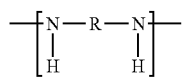
(III)

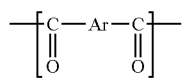
(IV)

wherein, in the general formula (II), n represents an integer of 2 to 18; in the general formula (III), R represents an aliphatic or alicyclic divalent group; and in the general formula (IV), Ar represents an arylene group.

The total of the above-described diamine units and the above-described dicarboxylic acid units does not exceed 100 mol %. In addition, the semi-aromatic polyamide (B) may further comprise constituting units other than the above-described constituting units in a range that does not impair the effects of the present invention. Moreover, with regard to the content ratio between the diamine units and the dicarboxylic acid units in the semi-aromatic polyamide (B), from the viewpoint of a polymerization reaction, the semi-aromatic polyamide (B) preferably comprises the two types of units in almost equal amounts, and the content of the dicarboxylic acid units (mol % based on the total constituting units) is more preferably ±2 mol % of the content of the above-described diamine units.

[Polyamide (B1)]

The polyamide (B1) has diamine units comprising 50 mol % or more of the aromatic diamine units represented by the general formula (I), and dicarboxylic acid units comprising 50 mol % or more of the α,ω-linear aliphatic dicarboxylic acid units represented by the general formula (II).

From the viewpoint of the improvement of transparency and color tone, or moldability, as well as giving excellent gas barrier properties, the diamine units that constitute the polyamide (B1) comprise preferably 70 mol % or more of, more preferably 80 mol % or more of, further preferably 90 mol % or more of, and particularly preferably 95 mol % or more of the aromatic diamine units represented by the general formula (I) therein.

Examples of a compound capable of constituting the aromatic diamine unit represented by the general formula (I) include o-xylylenediamine, m-xylylenediamine and p-xylylenediamine. Among these, m-xylylenediamine is preferably used. These compounds can be used alone as a single type, or in combination of two or more types.

Examples of compounds capable of constituting diamine units other than the aromatic diamine unit represented by the general formula (I) include 1,3-bis(aminomethyl)cyclohexane, 1,4-bis(aminomethyl)cyclohexane, tetramethylenediamine, pentamethylenediamine, hexamethylenediamine, octamethylenediamine, nonamethylenediamine, 2-methyl-1,5-pentanediamine, and 1-amino-3-aminomethyl-3,5,5-trimethylcyclohexane, but are not limited thereto. These compounds can be used alone as a single type, or in combination of two or more types.

From the viewpoint of giving flexibility, as well as moderate crystallinity, to the resin composition, the dicarboxylic acid units constituting the polyamide (B1) comprise preferably 70 mol % or more of, more preferably 80 mol % or more of, further preferably 90 mol % or more of, and particularly preferably 95 mol % or more of the α,ω-linear aliphatic dicarboxylic acid units represented by the general formula (II) therein.

In the general formula (II), n represents an integer of 2 to 18, preferably 3 to 16, more preferably 4 to 12, and further preferably 4 to 8. Examples of a compound capable of constituting the α,ω-linear aliphatic dicarboxylic acid unit represented by the general formula (II) include succinic acid, glutaric acid, adipic acid, pimelic acid, suberic acid, azelaic acid, sebacic acid, 1,10-decanedicarboxylic acid, 1,11-undecanedicarboxylic acid, and 1,12-dodecanedicarboxylic acid, but are not limited thereto. These compounds can be used alone as a single type, or in combination of two or more types.

Among these compounds, from the viewpoint of easy availability as well as excellent gas barrier properties, the dicarboxylic acid units in the polyamide (B1) comprise at least one type selected from the group consisting of adipic acid units, sebacic aid units and 1,12-dodecanedicarboxylic acid units, in a total amount of preferably 70 mol % or more, more preferably 80 mol % or more, further preferably 90 mol % or more, and particularly preferably 95 mol % or more.

Among others, from the viewpoint of the expression of gas barrier properties and suitable thermal properties such as a glass transition temperature or a melting point, the dicarboxylic acid units in the polyamide (B1) preferably comprise 70 mol % or more of adipic acid units therein. The type of dicarboxylic acid may be selected, as appropriate, depending on intended use. For example, from the viewpoint of imparting moderate gas barrier properties and mold processing suitability to the resin composition, the dicarboxylic acid units in the polyamide (B1) preferably comprise 70 mol % or more of sebacic acid units therein. Moreover, when the resin composition is used for intended use required to have low water absorbency, weather resistance and heat resistance, the dicarboxylic acid units preferably comprise 70 mol % or more of 1,12-dodecanedicarboxylic acid units therein.

From the viewpoint of further enhancing gas barrier properties, the dicarboxylic acid units in the polyamide (B1) may comprise, as compounds capable of constituting dicarboxylic acid units other than the α,ω-linear aliphatic dicarboxylic acid unit represented by the general formula (II), aromatic dicarboxylic acids such as terephthalic acid, isophthalic acid, 2,6-naphthalenedicarboxylic acid or biphenyldicarboxylic acid, in the range of less than 30 mol %, and preferably 3 to 20 mol %. These compounds can be used alone as a single type, or in combination of two or more types.

Among these compounds, the polyamide (B1) is preferably a polyamide, which comprises diamine constituting units comprising 70 mol % or more of m-xylylenediamine-derived diamine constituting units, and dicarboxylic acid units comprising 70 mol % or more of dicarboxylic acid units derived from α,ω-linear aliphatic dicarboxylic acid having 4 to 8 carbon atoms.

From the viewpoint of heat resistance and melt moldability, the melting point Tm of the polyamide (B1) is preferably 200° C. to 245° C., and more preferably 220° C. to 240° C.

[Polyamide (B2)]

The polyamide (B2) has diamine units comprising 50 mol % or more of the aliphatic diamine units represented by the general formula (III), and dicarboxylic acid units comprising 50 mol % or more of the aromatic dicarboxylic acid units represented by the general formula (IV).

From the viewpoint of imparting moderate flexibility and moderate crystallinity to the resin composition, the diamine units that constitute the polyamide (B2) comprise preferably 70 mol % or more of, more preferably 80 mol % or more of, further preferably 90 mol % or more of, and particularly preferably 95 mol % or more of the aliphatic diamine units represented by the general formula (III) therein.

In the general formula (III), R represents an aliphatic or alicyclic divalent group, wherein the number of carbon atoms contained in the divalent group is 2 to 18, preferably 3 to 16, more preferably 4 to 14, and further preferably 6 to 12.

Examples of a compound capable of constituting the aliphatic diamine unit represented by the general formula (III) include: straight chain aliphatic diamines such as ethylenediamine, N-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine; aliphatic diamines having a side chain, such as 2-methyl-1,5-pentanediamine; and alicyclic diamines such as 1,3-bis(aminomethyl)cyclohexane, 1,4-bis(aminomethyl)cyclohexane, and 1-amino-3-aminomethyl-3,5,5-trimethylcyclohexane, but are not limited thereto. These compounds can be used alone as a single type, or in combination of two or more types.

Among others, from the viewpoint of imparting flexibility to the resin composition, the diamine units in the polyamide (B2) comprise preferably 70 mol % or more of, more preferably 80 mol % or more of, further preferably 90 mol % or more of, and particularly preferably 95 mol % or more of hexamethylene diamine units, nonamethylenediamine units or decamethylenediamine units therein.

From the viewpoint of enhancing gas barrier properties, the dicarboxylic acid units that constitute the polyamide (B2) comprise preferably 70 mol % or more of, more preferably 80 mol % or more of, further preferably 90 mol % or more of, and particularly preferably 95 mol % or more of the aromatic dicarboxylic acid units represented by the general formula (IV) therein.

In the general formula (IV), Ar represents an arylene group. The arylene group is an arylene group having preferably 6 to 30, and more preferably 6 to 15 carbon atoms, and examples of such an arylene group include a phenylene group and a naphthylene group.

Examples of a compound capable of constituting the aromatic dicarboxylic acid unit represented by the general formula (IV) include terephthalic acid, isophthalic acid, orthophthalic acid, 2,6-naphthalenedicarboxylic acid, 1,5-naphthalenedicarboxylic acid, anthracenedicarboxylic acid, and their ester-forming derivatives, but are not limited thereto. These compounds can be used alone as a single type, or in combination of two or more types.

Among others, the dicarboxylic acid units in the polyamide (B2) comprise at least one type selected from the group consisting of isophthalic acid units, terephthalic acid units and 2,6-naphthalenedicarboxylic acid units, in a total amount of preferably 70 mol % or more, more preferably 80 mol % or more, further preferably 90 mol % or more, and particularly preferably 95 mol % or more. These units can be used alone as a single type, or in combination of two or more types. From the viewpoint of facilitating polymerization, it is preferable to use isophthalic acid units alone, or in combination with terephthalic acid units.

Examples of compounds capable of constituting dicarboxylic acid units other than the aromatic dicarboxylic acid unit represented by the general formula (IV) include aliphatic dicarboxylic acid, alicyclic dicarboxylic acid, an acid anhydride thereof, having 2 to 20, preferably 4 to 16, and more preferably 4 to 12 carbon atoms, and an alkyl (C1-3) ester, but are not limited thereto.

Specific examples of the aliphatic dicarboxylic acid having 2 to 20 carbon atoms include oxalic acid, malonic acid, succinic acid, glutaric acid, adipic acid, pimelic acid, suberic acid, azelaic acid, sebacic acid, fumaric acid, maleic acid, citraconic acid, 2-methylsuccinic acid, itaconic acid, and glutaconic acid. Examples of the alicyclic dicarboxylic acid include cyclohexanedicarboxylic acids and decalindicarboxylic acids.

From the viewpoint of heat resistance and melt moldability, the melting point Tm of the polyamide (B2) is preferably 250° C. to 315° C., more preferably 260° C. to 300° C., and further preferably 260° C. to 280° C.

In the semi-aromatic polyamides (B1) and (B2) used in the present invention, examples of compounds capable of constituting units other than the above-described diamine units and dicarboxylic acid units include polyvalent dicarboxylic acids (trivalent or higher dicarboxylic acids), such as trimellitic acid and pyromellitic acid, but are not limited thereto.

Examples of the semi-aromatic polyamide (B) that is particularly preferably used in the present invention include polyhexamethylene terephthalamide (polyamide 6T), polynonamethylene terephthalamide (polyamide 9T), a polyhexamethylene terephthalamide/polyhexamethylene isophthalamide copolymer (polyamide 6IT), poly-m-xylylene adipamide (polyamide MXD6), isophthalic acid copolymerized poly-m-xylylene adipamide (polyamide MXD6I), poly-m-xylylene sebacamide (polyamide MXD10), poly-m-xylylene dodecanamide (poly amide MXD12), poly-p-xylylene sebacamide (polyamide PXD10), and poly-p-xylylene adipamide (polyamide PXD6). More preferred examples of the semi-aromatic polyamide (B) include poly-m-xylylene adipamide, isophthalic acid copolymerized poly-m-xylylene adipamide, and a polyhexamethylene terephthalamide/polyhexamethylene isophthalamide copolymer.

The number average molecular weight (Mn) of the semi-aromatic polyamide (B) used in the present invention is not particularly limited. It is preferably 2000 or more, more preferably 4000 or more, and further preferably 5000 or more. On the other hand, it is preferably 50000 or less, more preferably 45000 or less, and further preferably 40000 or less. When the number average molecular weight is within the above-described range, there are only small amounts of unreacted products of polyamide, and thus, the properties are stable. The number average molecular weight can be measured by the following method. That is to say, the semi-aromatic polyamide (B) is dissolved in each of a phenol/ethanol mixed solvent, and in a benzyl alcohol solvent, and a carboxyl terminal group concentration and an amino terminal group concentration are then obtained by neutralization titration of hydrochloric acid and sodium hydroxide aqueous solutions. The number average molecular weight can be obtained from the quantitative values of the amino terminal group concentration and carboxyl terminal group concentration according to the following formula.

Number average molecular weight=2×1,000,000/
([NH2]+[COOH])

[NH2]: Amino terminal group concentration (µeq/g)
[COOH]: carboxyl terminal group concentration (µeq/g)

The semi-aromatic polyamide (B) can be produced by polycondensation of diamine components capable of constituting the above-described diamine units and dicarboxylic acid components capable of constituting the above-described dicarboxylic acid units. The production method is the same as that for the polyamide (A2). The polymerization degree can be controlled by adjusting polycondensation conditions and the like. Upon the polycondensation, a small amount of monoamine or monocarboxylic acid may be added as a molecular weight adjuster. Moreover, in order to suppress the polycondensation reaction to obtain a desired polymerization degree, the ratio (molar ratio) between the diamine components and the dicarboxylic acid components constituting the semi-aromatic polyamide (B) may be adjusted, such that it deviates from 1.

In the semi-aromatic polyamide (B) used in the present invention, the molar ratio between the diamine units and the dicarboxylic acid units (the number of moles of diamine units/the number of moles of dicarboxylic acid units) is in the range of 0.97 to 1.02. When the molar ratio between the diamine units and the dicarboxylic acid units in the semi-aromatic polyamide (B) is within the above-described range, the compatibility with the aliphatic polyamide (A) and mechanical properties become high, and the melt viscosity can be in a suitable range, so that the moldability becomes favorable. The molar ratio between the diamine units and the dicarboxylic acid units is preferably 0.98 to 1.02, and more preferably 0.99 to 1.02. It is to be noted that the molar ratio between the diamine units and the dicarboxylic acid units (the number of moles of diamine units/the number of moles of dicarboxylic acid units) in the semi-aromatic polyamide (B) is calculated by the method described in the after-mentioned Examples.

(3) Impact Modifier (C)

The impact modifier (C) used in the thermoplastic resin composition of the present invention is a component for improving the impact resistance of polyamide components including the aliphatic polyamide (A) and the semi-aromatic polyamide (B). The impact modifier (C) that can be used herein is not particularly limited, as long as it improves an elongation rate at the breaking point of a polyamide component. It is to be noted that, in the present invention, the elongation rate at the breaking point can be measured by the method described in the after-mentioned Examples.

Specific examples of the impact modifier (C) include:

olefinic polymers, such as an ethylene-α-olefin copolymer, a propylene-α-olefin copolymer, an ethylene-propylene-α-olefin copolymer, an ethylene-α,β-unsaturated carboxylic acid copolymer, a propylene-α,β-unsaturated carboxylic acid copolymer, an ethylene-propylene-α,β-unsaturated carboxylic acid copolymer, an ethylene-α,β-unsaturated carboxylic acid ester copolymer, a propylene-α,β-unsaturated carboxylic acid ester copolymer, an ethylene-propylene-α,β-unsaturated carboxylic acid ester copolymer, an ethylene-α,β-unsaturated carboxylic acid/unsaturated carboxylic acid ester copolymer, a propylene-α,β-unsaturated carboxylic acid/unsaturated carboxylic acid ester copolymer, an ethylene-propylene-α,β-unsaturated carboxylic acid/unsaturated carboxylic acid ester copolymer, and an ionomeric polymer;

elastomers, such as a styrene elastomer, a urethane elastomer, a fluorine elastomer, a vinyl chloride elastomer, a polyester elastomer, and a polyamide elastomer; and synthetic rubbers, such as Thiokol rubber, polysulfide rubber, acrylic rubber, silicone rubber, polyether rubber, and epichlorohydrin rubber.

Among these substances, olefinic polymers and elastomers are preferable because they are excellent in terms of heat resistance and compatibility with polyamide components. More preferred examples include an ethylene-α-olefin copolymer, a propylene-α-olefin copolymer, an ethylene-propylene-α-olefin copolymer, an ethylene-α,β-unsaturated carboxylic acid copolymer, a propylene-α,β-unsaturated carboxylic acid copolymer, an ethylene-propylene-α,β-unsaturated carboxylic acid copolymer, an ethylene-α,β-unsaturated carboxylic acid ester copolymer, a propylene-α,β-unsaturated carboxylic acid ester copolymer, an ethylene-propylene-α,β-unsaturated carboxylic acid ester copolymer, an ethylene-α,β-unsaturated carboxylic acid/unsaturated carboxylic acid ester copolymer, a propylene-α,β-unsaturated carboxylic acid/unsaturated carboxylic acid ester copolymer, an ethylene-propylene-α,β-unsaturated carboxylic acid/unsaturated carboxylic acid ester copolymer, and a styrene elastomer.

These impact modifiers (C) can be used alone as a single type, or in combination of two or more types.

Among the olefinic polymers used in the present invention, an ethylene-α-olefin copolymer, a propylene-α-olefin copolymer, and an ethylene-propylene-α-olefin copolymer are polymers each formed by copolymerizing at least one selected from ethylene and propylene with α-olefin having 3 or more carbon atoms.

Examples of the α-olefin having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 4-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and a combination thereof.

In addition, such an olefinic polymer may be copolymerized with one or two or more of non-conjugated dienes, such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

The ethylene-α,β-unsaturated carboxylic acid copolymer, propylene-α,β-unsaturated carboxylic acid copolymer, ethylene-propylene-α,β-unsaturated carboxylic acid copolymer, ethylene-α,β-unsaturated carboxylic acid ester copolymer, propylene-α,β-unsaturated carboxylic acid ester copolymer, ethylene-propylene-α,β-unsaturated carboxylic acid ester copolymer, ethylene-α,β-unsaturated carboxylic acid/unsaturated carboxylic acid ester copolymer, propylene-α,β-unsaturated carboxylic acid/unsaturated carboxylic acid ester copolymer, and ethylene-propylene-α,β-unsaturated carboxylic acid/unsaturated carboxylic acid ester copolymer are all polymers formed by copolymerizing at least one selected from ethylene and propylene with at least one selected from α,β-unsaturated carboxylic acid monomers and unsaturated carboxylic acid ester monomers.

Examples of the α,β-unsaturated carboxylic acid monomer include acrylic acid and methacrylic acid.

Examples of the α,β-unsaturated carboxylic acid ester monomer include a methyl ester, an ethyl ester, a propyl ester, a butyl ester, a pentyl ester, a hexyl ester, a heptyl ester, an octyl ester, a nonyl ester and a decyl ester of these unsaturated carboxylic acids, and their mixtures.

Specific examples of the olefinic polymer include EPR (ethylene-propylene copolymer), EPDM (ethylene-propylene-diene copolymer), EBR (ethylene-butene copolymer), EOR (ethylene-octene copolymer), EEA (ethylene-ethyl acrylate copolymer), EMA (ethylene-methyl acrylate copolymer), EAA (ethylene-acrylic acid copolymer), and EMAA (ethylene-methyl methacrylate copolymer).

The ionomeric polymer is formed by ionization of at least a part of carboxyl groups in a copolymer of olefin and α,β-unsaturated carboxylic acid as a result of neutralization of metal ions. As olefin, ethylene is preferably used. As α,β-unsaturated carboxylic acid, acrylic acid and methacrylic acid are preferably used. An unsaturated carboxylic acid ester monomer may be copolymerized with the α,β-unsaturated carboxylic acid.

Examples of the metal ion include alkaline metals and alkaline-earth metals, such as Li, Na, K, Mg, Ca, Sr, and Ba, and also Al, Sn, Sb, Ti, Mn, Fe, Ni, Cu, Zn, and Cd.

The styrene elastomer is a block copolymer consisting of an aromatic vinyl compound-based polymer block such as styrene and a conjugated diene-based polymer block. In the styrene elastomer, a block copolymer having at least one aromatic vinyl compound-based polymer block and at least one conjugated diene-based polymer block are used. The unsaturated bond in the conjugated diene-based polymer block may be hydrogenated.

The aromatic vinyl compound-based polymer block is a polymer block consisting of structural units mainly derived from an aromatic vinyl compound. Examples of the aromatic vinyl compound include styrene, α-methylstyrene, o-methylstyrene, m-methylstyrene, p-methylstyrene, 2,4-dimethylstyrene, 2,6-dimethylstyrene, vinylnaphthalene, vinylanthracene, 4-propylstyrene, 4-cyclohexylstyrene, 4-dodecylstyrene, 2-ethyl-4-benzylstyrene, and 4-(phenylbutyl) styrene. The aromatic vinyl compound-based polymer block has structural units consisting of one or two or more types of these monomers. In some cases, the aromatic vinyl compound-based polymer block may also have small amounts of structural units consisting of other unsaturated monomers.

The conjugated diene-based polymer block is a polymer block formed from one or two or more types of conjugated diene compounds such as 1,3-butadiene, chloroprene, isoprene, 2,3-dimethyl-1,3-butadiene, 1,3-pentadiene, 4-methyl-1,3-pentadiene, and 1,3-hexadiene.

Specific examples of the styrene elastomer include SBS (styrene-butylene-styrene block copolymer), SEBS (styrene-ethylene-butylene-styrene block copolymer), SEPS (styrene-ethylene-propylene-styrene block copolymer), and SIS (styrene-isoprene-styrene copolymer).

As such an impact modifier (C), an impact modifier that is acid-modified with carboxylic acid and/or a derivative thereof can be preferably used. By modifying the impact modifier (C) with acid, a functional group having affinity to a polyamide component can be advantageously introduced into a molecule.

Preferred examples of the functional group having affinity to a polyamide component include a carboxylic acid group, a carboxylic anhydride group, a carboxylic acid ester group, a carboxylic acid metal salt group, a carboxylic acid imide group, a carboxylic acid amide group, and an epoxy group.

Preferred examples of a compound capable of acid-modifying the impact modifier include acrylic acid, methacrylic acid, maleic acid, fumaric acid, itaconic acid, crotonic acid, methyl maleic acid, methyl fumaric acid, mesaconic acid, citraconic acid, glutaconic acid, cis-4-cyclohexene-1,2-dicarboxylic acid, endobicyclo[2.2.1]-5-heptene-2,3-dicarboxylic acid, metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-[2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itanonate, and glycidyl citraconate.

Preferred examples of such an acid-modified impact modifier (C) include a maleic anhydride-modified ethylene-propylene copolymer, a maleic anhydride-modified ethylene-butene copolymer, a maleic anhydride-modified styrene-ethylene-butylene-styrene block copolymer, a maleic acid-modified ethylene-propylene copolymer, a maleic acid-modified ethylene-butene copolymer, and a maleic acid-modified styrene-ethylene-butylene-styrene block copolymer.

The acid modification rate (i.e., the mass ratio of an acid used in modification to a base resin) is preferably 0.01% to 5% by mass, more preferably 0.05% to 4% by mass, and further preferably 0.1% to 3% by mass. When the acid modification rate is within the above-described range, the effect of enhancing affinity to the polyamide component can be exhibited, without impairing thermal stability. The acid modification rate can be obtained by dissolving a resin sample in heated xylene, and then titrating the solution with sodium methylate, using phenolphthalein as an indicator.

From the viewpoint of heat resistance and melt moldability, the melting point Tm of the impact modifier (C) is preferably 40° C. to 150° C., more preferably 40° C. to 100° C., and further preferably 40° C. to 80° C.

The impact modifiers (C) may be used alone as a single type, or in combination of two or more types. In addition, an acid-modified impact modifier (C) may also be combined with an impact modifier (C) that has not been modified by acid.

The thermoplastic resin composition of the present invention comprises an aliphatic polyamide (A), a semi-aromatic polyamide (B) and an impact modifier (C), wherein the thermoplastic resin composition of the present invention is characterized in that at least a part of the impact modifier (C) is dispersed in the semi-aromatic polyamide (B).

The state in which at least a part of the impact modifier (C) is dispersed in the semi-aromatic polyamide (B), and the dispersed amount thereof (mass ratio), can be confirmed and measured by observing the section of a molded body of the thermoplastic resin composition under SEM (Scanning Electron Microscope). Specifically, the molded body is cut with a microtome to obtain a sample piece, and the sample piece is then immersed in a 10-mass-% phosphotungstic acid aqueous solution under an atmosphere of 80° C. for 8 hours. Thereafter, the section of the sample piece is observed under SEM at a magnification of 10000 times, and the image of the observed section is then subjected to image processing, so that the dispersed amount can be measured. The image processing can be carried out, for example, using "WinROOF" manufactured by MITANI CORPORATION. An unstained impact modifier (C) is observed in a stained semi-aromatic polyamide (B), and based on the area ratio and the specific gravity, the mass ratio of the impact modifier (C) dispersed in the semi-aromatic polyamide (B) can be estimated. In a case where at least a part of the impact modifier (C) is dispersed in the aliphatic polyamide (A), an unstained impact modifier (C) is observed in a stained aliphatic polyamide (A), and based on the area ratio and the specific gravity, the mass ratio of the impact modifier (C) dispersed in the aliphatic polyamide (A) can be estimated.

In the process of producing a thermoplastic resin composition, in a case where the impact modifier (C) has previously been mixed with a sufficient amount of the semi-aromatic polyamide (B) (i.e., in an amount 4 times or more the mass ratio of the impact modifier (C)) and the obtained mixture is then mixed with remaining components of the thermoplastic resin composition, it can be assumed that the total amount of the impact modifier (C) previously mixed with the semi-aromatic polyamide (B) will be dispersed in the semi-aromatic polyamide (B). On the other hand, in a case where the impact modifier (C) has previously been mixed with a sufficient amount of the aliphatic polyamide (A) (i.e., in an amount 4 times or more the mass ratio of the impact modifier (C)) and the obtained mixture is then mixed with remaining components of the thermoplastic resin composition, it can be assumed that the total amount of the impact modifier (C) previously mixed with the aliphatic polyamide (A) will be dispersed in the aliphatic polyamide (A). Moreover, in a case where the impact modifier (C) is simultaneously mixed with the aliphatic polyamide (A) and with the semi-aromatic polyamide (B), it is considered that the weight of the impact modifier (C) dispersed in the aliphatic polyamide (A) (W(C, A)) and the weight of the impact modifier (C) dispersed in the semi-aromatic polyamide (B) (W(C, B)) are proportion to the weight of the aliphatic polyamide (A) in the thermoplastic resin composition (W(A)) and the weight of the semi-aromatic polyamide (B) in the thermoplastic resin composition (W(B)), respectively.

In the thermoplastic resin composition of the present invention, the mass ratio of the impact modifier (C) to the total mass of the semi-aromatic polyamide (B) and the impact modifier (C) is within the range of 5% to 15%. By using the impact modifier (C) in this range, an increase in the melt viscosity of the thermoplastic resin composition can be suppressed upon the retention of the thermoplastic resin composition in a melted state, thereby providing good moldability, and in addition, moderate flexibility can be imparted to the thermoplastic resin composition. The mass ratio is preferably 6% or more, more preferably 8% or more, and further preferably 10% or more. Also, it is preferably 14% or less, more preferably 13% or less, and further preferably 10% or less.

In one embodiment of the present invention, the mass ratio of the impact modifier (C) dispersed in the semi-aromatic polyamide (B) to the total mass of the semi-aromatic polyamide (B) and the impact modifier (C) is preferably within the above-described range.

Moreover, in one embodiment of the present invention, from the viewpoint of imparting sufficient flexibility to the thermoplastic resin composition, the ratio of the weight of the impact modifier (C) dispersed in the semi-aromatic polyamide (B) (W(C, B)) to the weight of the impact modifier (C) dispersed in the aliphatic polyamide (A) (W(C, A)), (W(C, B)/W(C, A)), is preferably greater than the ratio of the weight of the semi-aromatic polyamide (B) (W(B)) to the weight of the aliphatic polyamide (A) (W(A)) in the thermoplastic resin composition (W(B)/W(A)), ((W(C, B)/W(C, A))>(W(B)/W(A))).

The mixed amounts of the aliphatic polyamide (A) and the semi-aromatic polyamide (B) are not particularly limited, as long as they are within a range that can provide desired gas barrier properties and flexibility to the thermoplastic resin composition, depending on intended use. The mass ratio between the aliphatic polyamide (A) and the semi-aromatic polyamide (B) (the mass of the aliphatic polyamide (A):the mass of the semi-aromatic polyamide (B)) is preferably in the range of preferably 15:85 to 85:15, more preferably 18:82 to 82:18, further preferably 20:80 to 80:20, and particularly preferably 40:60 to 60:40.

The thermoplastic resin composition of the present invention may comprise various types of additives, unless they do not impair the purpose of the present invention. Examples of various types of additives include plasticizers such as benzenesulfonic acid alkyl amides, toluenesulfonic acid alkyl amides and hydroxybenzoic acid alkyl esters, conductive fillers such as carbon black, graphite and metal-containing fillers, an antioxidant, a thermal stabilizer, an ultraviolet absorber, a light stabilizer, a lubricant, an inorganic filler, an antistatic agent, a fire retardant, and a crystallization promoter.

The thermoplastic resin composition of the present invention can be prepared by mixing the aliphatic polyamide (A), the semi-aromatic polyamide (B), the impact modifier (C) and as necessary, various types of additives, and then melt-kneading the obtained mixture with an extruder.

In one embodiment of the present invention, a resin composition (D) obtained by previously melt-kneading the semi-aromatic polyamide (B) and the impact modifier (C) is melt-kneaded with the aliphatic polyamide (A), so that the thermoplastic resin composition can be prepared. In this case, various types of additives, together with the aliphatic polyamide (A), are preferably melt-kneaded with the resin composition (D). According to this method, the impact modifier (C) can be dispersed in the semi-aromatic polyamide (B) at a desired amount ratio. For example, the ratio of the weight of the impact modifier (C) dispersed in the semi-aromatic polyamide (B) (W(C, B)) to the weight of the impact modifier (C) dispersed in the aliphatic polyamide (A) (W(C, A)), (W(C, B)/W(C, A)), can be set greater than the ratio of the weight of the semi-aromatic polyamide (B) (W(B)) to the weight of the aliphatic polyamide (A) (W(A)) in the resin composition (W(B)/W(A)) (namely, (W(C, B)/W(C, A))>(W(B)/W(A))).

In this case, the melt viscosity of the resin composition (D) at 260° C. at a shear rate of 100/s is in the range of preferably 50 to 2000 Pa·s, more preferably 100 to 2000 Pa·s, further preferably 200 to 2000 Pa·s, and particularly preferably 300 to 2000 Pa·s. If the melt viscosity of the resin composition (D) is within the above-described range, it can be a melt viscosity suitable for the molding performed using various types of molding machines such as an extruder and an injection molding machine, and thus, it provides good moldability.

2. Molded Body

For example, the thermoplastic resin composition of the present invention is pelletized or granulated, and thereafter, a known molding method such as extrusion molding is applied to the thus pelletized or granulated composition, so that the present thermoplastic resin composition can be molded into various types of shapes such as a hollow molded body, a film-like molded body, and fibers. Since the molded body of the present invention is excellent in terms of flexibility and gas barrier properties, it can be preferably used in a fuel transportation piping material, a fuel storage container, or the like. For example, the present molded body is suitable for a fuel transportation piping material or a fuel storage container used for: alkanes such as hexane and octane; aromatic compounds such as toluene and benzene; alcohols such as methanol and ethanol; and alcohol-containing gasoline in which isooctane, toluene and alcohol are mixed.

The molded body of the present invention may have a multilayer structure having, for example, a layer comprising the thermoplastic resin composition of the present invention and a layer consisting of other materials. When the molded body of the present invention has a multilayer structure, since a layer comprising the thermoplastic resin composition of the present invention is excellent in terms of fuel permeation resistance, chemical resistance, etc., it is preferable to dispose this layer on a more inner side.

The thickness of the molded body of the present invention may be determined, as appropriate, depending on intended use, and it is not particularly limited. From the viewpoint of gas barrier properties and flexibility, the thickness of the present molded body is in the range of preferably 0.01 to 10 mm, and more preferably 0.1 to 5 mm.

In one embodiment of the present invention, since the molded body of the present invention has good extrusion moldability and is excellent in terms of the balance between flexibility and gas barrier properties, it is preferably molded into a hollow molded body, such as a tube, a pipe, a hose and a connector, and is then used. The molded body of the present invention can be preferably used as a fuel pipe, a fuel hose, a fuel tube, or a connector capable of connecting them.

A hollow molded body, such as a tube, a pipe, a hose and a connector, can be produced by subjecting the thermoplastic resin composition of the present invention to melt extrusion using an extruder, then extruding it into a cylindrical shape through a circular die, then giving a shape through a sizing former for controlling a size, then cooling the resultant in a water tank or the like, and then winding it with a take-off machine.

When the hollow molded body has a multilayer structure, it can be produced by a method which comprises subjecting materials that constitute individual layers to melt extrusion using extruders that correspond to the number of the layers or the number of materials, thereby supplying the materials into a die, then making individual circular currents, and then simultaneously extruding them to the inside or outside of the die, so as to produce a multilayer molded body (co-extrusion method), or a method which comprises previously producing a monolayer hollow molded body, and then, successively laminating each resin on the outside of the monolayer hollow molded body, as necessary, using an adhesive, while integrating such resins, so as to produce a multilayer molded body (coating method).

When the hollow molded body has a complicated shape, or when heat bending processing is performed after completion of the molding of a molded body, in order to eliminate residual strain from the molded product, after a hollow molded body has been formed, the hollow molded body is subjected to a heat treatment at a temperature that is lower than the lowest melting point among the melting points of individual resins constituting the hollow molded body, so as to obtain a molded product of interest.

The hollow molded body of the present invention may have a waveform region in at least a part thereof. The term "waveform region" is used herein to mean a region formed to have a waveform shape, a bellows shape, an accordion shape, or a corrugate shape. A hollow molded body having such a waveform region can be easily formed by molding a straight tube-shaped hollow molded body, and then subjecting the molded body to mold forming, so as to form a predetermined waveform shape. Moreover, the hollow molded body of the present invention can also be molded, for example, by adding a necessary component such as a connector to the molded body, or the multilayer hollow molded body of the present invention can also be molded into a shape such as an L-shape or a U-shape by performing bending processing.

EXAMPLES

Hereinafter, the present invention will be described in more detail in the following examples. However, these examples are not intended to limit the scope of the present invention. It is to be noted that various types of physical properties described in the Examples or the like were evaluated by the following methods.

(1) Tensile Modulus of Elasticity and Tensile Breaking Elongation Percentage

The tensile modulus of elasticity and a tensile breaking elongation percentage were measured in accordance with JIS K-7161: 1994 and K-7127: 1999. A film having a thickness of 100 μm produced in each of the following examples and comparative examples was cut to a size of 10 mm×100 mm, and it was then used as a test piece. Using Strograph manufactured by Toyo Seiki Seisaku-Sho, Ltd., a tensile test was carried out under conditions of a measurement temperature of 23° C., a humidity of 50% RH, a distance between chucks of 50 mm and a tensile rate of 50 mm/min, and a tensile modulus of elasticity and a tensile breaking elongation percentage were obtained.

(2) Fuel Barrier Properties (CE10 Transmission Rate)

15 ml of CE10 (isooctane/toluene/ethanol=45/45/10 volume %) was added into an aluminum-made cup with a transmission section area of 11.34 $cm^2$, and the aperture of the cup was then sealed with a film with a thickness of 100 μm produced in each of following examples and comparative examples. Thereafter, the cup was left at rest under an atmosphere of 40° C. 300 hours after completion of the sealing, a change in the weight of the cup was measured.

(3) Oxygen Barrier Properties (OTR)

Oxygen barrier properties were measured in accordance with ASTM D3985. Specifically, using an oxygen transmission rate measurement device (manufactured by MOCON, trade name "OX-TRAN 2/21A"), the oxygen transmission coefficient (unit: ml·mm/m2·day·atm) of the produced test piece with a thickness of 100 μm was measured under an environment of 23° C. and 60% RH (relative humidity).

(4) Melt Viscosity of Resin Composition (D)

Using Capillograph D-1 manufactured by Toyo Seiki Seisaku-Sho, Ltd. as a measurement device, the melt viscosity of the resin composition (D) was measured under conditions of a die of 1 mmφ×10 mm (in length), an apparent shear rate of 100/sec, a measurement temperature of 260° C., and a sample water content of 1000 ppm or less.

(5) Melting Point

The melting point (Tm) was obtained by performing DSC measurement (differential scanning calorimetry) using a differential scanning calorimeter (manufactured by Shimadzu Corporation, trade name: DSC-60), at a temperature increase rate of 10° C./min, under a nitrogen current.

(6) Molar Ratio (r) Between Diamine Units and Dicarboxylic Acid Units in Semi-Aromatic Polyamide (B) (the Number of Moles of Diamine Units/the Number of Moles of Dicarboxylic Acid Units)

The molar ratio (r) was obtained according to the following formula:

$$r=(1-cN-b(C-N))/(1-cC+a(C-N))$$

wherein
a: M1/2,
b: M2/2,
c: 18.015,
M1: the molar weight of diamine as a raw material (g/mol),
M2: the molar weight of dicarboxylic acid as a raw material (g/mol),
N: the concentration of terminal amino group (equivalent/g), and
C: the concentration of terminal carboxyl group (equivalent/g).

(7) Observation of Dispersed State of Impact Modifier (C) in Thermoplastic Resin Composition The non-stretched film obtained in each of the following examples and comparative examples was cut with a microtome to obtain a sample piece, and the sample piece was then immersed in a 10-mass-% phosphotungstic acid aqueous solution under an atmosphere of 80° C. for 8 hours. Thereafter, the section of the sample piece was observed under SEM (a scanning electron microscope "SU8020" manufactured by Hitachi High-Technologies Corporation) at a magnification of 10000 times, and the image of the observed section was subjected to image processing, using "WinROOF" manufactured by MITANI CORPORATION. An unstained impact modifier (C) was observed in a stained aliphatic polyamide (A) or semi-aromatic polyamide (B), and based on the area ratio and the specific gravity, the mass ratio of the impact modifier (C) dispersed in the semi-aromatic polyamide (B) ((C)/(B)+(C)), or the mass ratio of the impact modifier (C) dispersed in the aliphatic polyamide (A) ((C)/(A)+(C)) was estimated.

Synthesis Example 1

726.4 g of adipic acid, 0.6337 g of sodium hypophosphite monohydrate, and 0.4414 g of sodium acetate were added to a reactor with a volume of approximately 3 L, which was equipped with a stirrer, a nitrogen gas introduction port and a condensation water discharge port. The inside of the reactor was sufficiently substituted with nitrogen, and thereafter, while nitrogen gas was supplied at a rate of 20 ml/min, the substances were melted at 170° C. While the temperature in the reactor was gradually increased to 250° C., 672.9 g of m-xylylenediamine (MXDA) (manufactured by MITSUBISHI GAS CHEMICAL COMPANY, INC.) was added dropwise to the reaction mixture, and polymerization was then performed for approximately 2 hours, so as to obtain a semi-aromatic polyamide (b1).

The melting point of the obtained semi-aromatic polyamide (b1) was found to be 237° C., and the molar ratio of the reacted diamine units to the reacted dicarboxylic acid units (the number of moles of the diamine units/the number of moles of the dicarboxylic acid units) was found to be 0.994.

Synthesis Example 2

726.4 g of adipic acid, 0.6337 g of sodium hypophosphite monohydrate, and 0.4414 g of sodium acetate were added to a reactor with a volume of approximately 3 L, which was equipped with a stirrer, a nitrogen gas introduction port and a condensation water discharge port. The inside of the reactor was sufficiently substituted with nitrogen, and thereafter, while nitrogen gas was supplied at a rate of 20 ml/min, the substances were melted at 170° C. While the temperature in the reactor was gradually increased to 250° C., 687.1 g of m-xylylenediamine (MXDA) (manufactured by MITSUBISHI GAS CHEMICAL COMPANY, INC.) was added dropwise to the reaction mixture, and polymerization was then performed for approximately 2 hours, so as to obtain a semi-aromatic polyamide (b2).

The melting point of the obtained semi-aromatic polyamide (b2) was found to be 237° C., and the molar ratio of the reacted diamine units to the reacted dicarboxylic acid units (the number of moles of the diamine units/the number of moles of the dicarboxylic acid units) was found to be 1.015.

Synthesis Example 3

726.4 g of adipic acid, 0.6389 g of sodium hypophosphite monohydrate, and 0.4450 g of sodium acetate were added to a reactor with a volume of approximately 3 L, which was equipped with a stirrer, a nitrogen gas introduction port and a condensation water discharge port. The inside of the reactor was sufficiently substituted with nitrogen, and thereafter, while nitrogen gas was supplied at a rate of 20 ml/min, the substances were melted at 170° C. While the temperature in the reactor was gradually increased to 250° C., 697.3 g of m-xylylenediamine (MXDA) (manufactured by MITSUBISHI GAS CHEMICAL COMPANY, INC.) was added dropwise to the reaction mixture, and polymerization was then performed for approximately 2 hours, so as to obtain a semi-aromatic polyamide (b3).

The melting point of the obtained semi-aromatic polyamide (b3) was found to be 237° C., and the molar ratio of the reacted diamine units to the reacted dicarboxylic acid units (the number of moles of the diamine units/the number of moles of the dicarboxylic acid units) was found to be 1.030.

<Production of Resin Composition (D)>

Production Example 1

90 parts by mass of the semi-aromatic polyamide (b1) obtained in Synthesis Example 1 was dry blended with 10 parts by mass of maleic anhydride-modified ethylene-butene copolymer (c1) (manufactured by Mitsui Chemicals, Inc., trade name: TAFMER MH5020) used as an impact modifier. While the dry blended pellets were supplied to a twin screw extruder equipped with a screw with a diameter of 37 mm having a kneading portion consisting of a needing disk, a vacuum vent, and a strand die, through a hopper thereof, using a quantitative feeder at a supplying rate of 10 kg/hr, the supplied pellets were melt-kneaded at a screw rotation number of 100 rotations/min and at a cylinder temperature of 260° C., to obtain a resin composition (d1) comprising the semi-aromatic polyamide (B1) and the maleic anhydride-modified ethylene-butene copolymer (c1).

Production Example 2

A resin composition (d2) was obtained in the same manner as that of Production Example 1, with the exception that the semi-aromatic polyamide (b2) obtained in Synthesis Example 2 was used instead of the semi-aromatic polyamide (b1).

Production Example 3

A resin composition (d3) was obtained in the same manner as that of Production Example 1, with the exception that the semi-aromatic polyamide (b3) obtained in Synthesis Example 3 was used instead of the semi-aromatic polyamide (b1).

Production Example 4

A resin composition (d4) was obtained in the same manner as that of Production Example 1, with the exception that 85 parts by mass of the semi-aromatic polyamide (b1) obtained in Synthesis Example 1 was dry blended with 15 parts by mass of the maleic anhydride-modified ethylene-butene copolymer (c1) (manufactured by Mitsui Chemicals, Inc., trade name: TAFMER (trademark) M H 5020) used as an impact modifier, and the thus dry blended product was used.

Production Example 5

A resin composition (d5) was obtained in the same manner as that of Production Example 1, with the exception that 70 parts by mass of the semi-aromatic polyamide (b1) obtained in Synthesis Example 1 was dry blended with 30 parts by mass of the maleic anhydride-modified ethylene-butene copolymer (c1) (manufactured by Mitsui Chemicals, Inc., trade name: TAFMER (trademark) M H 5020) used as an impact modifier, and the thus dry blended product was used.

Production Example 6 (Comparative Production Example)

A resin composition (e1) was obtained in the same manner as that of Production Example 1, with the exception that 87 parts by mass of polyamide 11 (manufactured by Arkema, Rilsan (trademark) BESN P20 TL) was dry blended with 13 parts by mass of the maleic anhydride-modified ethylene-butene copolymer (c1) (manufactured by Mitsui Chemicals, Inc., trade name: TAFMER (trademark) MH5020) used as an impact modifier, and the thus dry blended product was used.

Production Example 7 (Comparative Production Example)

A resin composition (e2) was obtained in the same manner as that of Production Example 1, with the exception that 71 parts by mass of polyamide 11 (manufactured by Arkema, Rilsan (trademark) BESN P20 TL) was dry blended with 29 parts by mass of the maleic anhydride-modified ethylene-butene copolymer (c1) (manufactured by Mitsui Chemicals, Inc., trade name: TAFMER (trademark) MH5020) used as an impact modifier, and the thus dry blended product was used.
<Production of Thermoplastic Resin Composition (Film-like Molded Body)>

Example 1

20 parts by weight of the resin composition (d1) obtained in Production Example 1 was dry blended with 80 parts by weight of polyamide 11 (manufactured by Arkema, Rilsan (trademark) BESN P20 TL). Thereafter, a film was produced from the dry blended product, using a 30 mmφ single screw extruder, under conditions of an extrusion temperature of 260° C., a screw rotation number of 50 rpm, and a take-off speed of 2.5 m/min, thereby producing a non-stretched film having a thickness of approximately 100 µm.

Examples 2, 3, and 4

A non-stretched film having a thickness of approximately 100 µm was obtained in the same manner as that of Example 1, with the exception that the mixed amounts shown in Table 1 were applied as the mixed amounts of the resin composition (d1) obtained in Production Example 1 and polyamide 11.

Example 5

40 parts by weight of polyamide 11 (manufactured by Arkema, Rilsan (trademark) BESN P20 TL), 54 parts by weight of the semi-aromatic polyamide (b1) obtained in Synthesis Example 1, and 6 parts by weight of the maleic anhydride-modified ethylene-butene copolymer (c1) (manufactured by Mitsui Chemicals, Inc., trade name: TAFMER (trademark) MH5020) were dry blended with one another, and the thus dry blended product was then subjected to extrusion molding at a temperature of 260° C., thereby producing a non-stretched film having a thickness of approximately 100 µm.

Example 6

A non-stretched film having a thickness of approximately 100 µm was obtained in the same manner as that of Example 5, with the exception that the mixed amounts shown in Table 1 were applied as the mixed amounts of polyamide 11 (manufactured by Arkema, Rilsan (trademark) BESN P20 TL), the semi-aromatic polyamide (b1) obtained in Synthesis Example 1, and the maleic anhydride-modified ethylene-butene copolymer (c1) (manufactured by Mitsui Chemicals, Inc., trade name: TAFMER (trademark) MH5020).

Example 7

80 parts by weight of the resin composition (d2) obtained in Production Example 2 was dry blended with 20 parts by weight of polyamide 11 (manufactured by Arkema, Rilsan (trademark) BESN P20 TL), and the thus dry blended product was then subjected to extrusion molding at a temperature of 260° C., thereby producing a non-stretched film having a thickness of approximately 100 µm.

Example 8

80 parts by weight of the resin composition (d4) obtained in Production Example 4 was dry blended with 20 parts by weight of polyamide 11 (manufactured by Arkema, Rilsan (trademark) BESN P20 TL), and the thus dry blended product was then subjected to extrusion molding at a temperature of 260° C., thereby producing a non-stretched film having a thickness of approximately 100 µm.

Comparative Example 1

80 parts by weight of the semi-aromatic polyamide (b1) obtained in Synthesis Example 1 was dry blended with 20 parts by weight of polyamide 11 (manufactured by Arkema, Rilsan (trademark) BESN P20 TL), and the thus dry blended product was then subjected to extrusion molding at a temperature of 260° C., thereby producing a non-stretched film having a thickness of approximately 100 μm.

Comparative Example 2

54 parts by weight of the semi-aromatic polyamide (b1) obtained in Synthesis Example 1 was dry blended with 46 parts by weight of the resin composition (e1) obtained in Production Example 6, and the thus dry blended product was then subjected to extrusion molding at a temperature of 260° C., thereby producing a non-stretched film having a thickness of approximately 100 μm.

Comparative Example 3

72 parts by weight of the semi-aromatic polyamide (b1) obtained in Synthesis Example 1 was dry blended with 28 parts by weight of the resin composition (e2) obtained in Production Example 7, and the thus dry blended product was then subjected to extrusion molding at a temperature of 260° C., thereby producing a non-stretched film having a thickness of approximately 100 μm.

Comparative Example 4

80 parts by weight of the resin composition (d3) obtained in Production Example 3 was dry blended with 20 parts by weight of polyamide 11 (manufactured by Arkema, Rilsan (trademark) BESN P20 TL), and the thus dry blended product was then subjected to extrusion molding at a temperature of 260° C. However, the melt viscosity was high, and it was difficult to mold it.

Comparative Example 5

80 parts by weight of the resin composition (d5) obtained in Production Example 5 was dry blended with 20 parts by weight of polyamide 11 (manufactured by Arkema, Rilsan (trademark) BESN P20 TL), and the thus dry blended product was then subjected to extrusion molding at a temperature of 260° C. However, the melt viscosity was high, and it was difficult to mold it.

The films obtained in Examples 1 to 8 and Comparative Examples 1 to 3 were evaluated in terms of tensile properties and barrier properties. In addition, the films obtained in Examples 1 to 8 and Comparative Examples 2 and 3 were used to observe the dispersed state of an impact modifier (C) in a thermoplastic resin composition. The results are shown in Table 1 and Table 2.

TABLE 1

|  |  | Reference | Example | | | | | | | |
|---|---|---|---|---|---|---|---|---|---|---|
| Single PA11 product | | Ex. | 1 | 2 | 3 | 4 | 5 | 6 | 7 | 8 |
| Aliphatic polyamide (A) | wt % | 100 | 80 | 60 | 40 | 20 | 40 | 20 | 20 | 20 |
| Semi-aromatic polyamide (B) | | 0 | 18 | 36 | 64 | 72 | 54 | 72 | 72 | 68 |
| Impact modifier (C) | | 0 | 2 | 4 | 6 | 8 | 6 | 8 | 8 | 12 |
| Matrix resin in which (C) is dispersed | | — | B | B | B | B | A, B | A, B | B | B |
| Tensile modulus of elasticity | MPa | 310 | 580 | 1050 | 1468 | 1820 | 1454 | 1848 | 1852 | 1683 |
| Breaking elongation percentage | % | 477 | 425 | 438 | 416 | 428 | 302 | 284 | 463 | 467 |
| CE10 transmission rate 40° C., 300 h | g-mm/m²-day | 16.50 | 12.1 | 7.6 | 2.44 | 0.81 | 3.57 | 1.61 | 0.82 | 1.71 |
| OTR 23° C., 60% RH | cc-mm/m²-day-atm | 12.13 | 7.43 | 2.12 | 0.55 | 0.24 | 1.04 | 0.49 | 0.23 | 0.42 |
| Molar ratio of MXD6 | (NH2/COOH) | — | 0.994 | 0.994 | 0.994 | 0.994 | 0.994 | 0.994 | 1.015 | 0.994 |
| Melt viscosity of resin composition (D) 260° C./100 s-1 | Pa · s | Unmeasured | 1210 | 1210 | 1210 | 1210 | — | — | 1950 | 1500 |
| Ratio of (C) in (A) | wt % | — | — | — | — | — | 6 | 8 | — | — |
| Ratio of (C) in (B) | wt % | — | 10 | 10 | 10 | 10 | 6 | 8 | 10 | 15 |

TABLE 2

|  |  | Comparative Example | | | | |
|---|---|---|---|---|---|---|
|  |  | 1 | 2 | 3 | 4 | 5 |
| Aliphatic polyamide (A) | wt % | 20 | 40 | 20 | 20 | 20 |
| Semi-aromatic polyamide (B) | | 80 | 54 | 72 | 72 | 56 |
| Impact modifier (C) | | — | 6 | 8 | 8 | 24 |
| Matrix resin in which (C) is dispersed | | — | A | A | B | B |
| Tensile modulus of elasticity | MPa | 2171 | 1452 | 1834 | — | — |
| Breaking elongation percentage | % | 23 | 155 | 98 | — | — |
| CE10 transmission rate 40° C., 300 h | g-mm/m²-day | 0.50 | 3.01 | 1.02 | — | — |
| OTR 23° C. 60% RH | cc-mm/m²-day-atm | 0.18 | 1.01 | 0.47 | — | — |
| Molar ratio of MXD6 | (NH2/COOH) | 0.994 | 0.994 | 0.994 | 1.030 | 0.994 |
| Melt viscosity of resin composition (D) 260° C./100 s-1 | Pa · s | — | — | — | 2800 | 3000 |

TABLE 2-continued

|  |  | Comparative Example | | | | |
|---|---|---|---|---|---|---|
|  |  | 1 | 2 | 3 | 4 | 5 |
| Ratio of (C) in (A) | wt % | — | 13 | 28 | — | — |
| Ratio of (C) in (B) | wt % | — | — | — | — | — |

As shown in these results, when compared with the case of a single polyamide 11 product, the thermoplastic resin compositions of Examples 1 to 8 had a tensile modulus of elasticity and gas barrier properties, which were significantly improved in proportion to the mixed amount of the semi-aromatic polyamide (B), and their breaking elongation percentage was also maintained at a certain level or higher.

On the other hand, in the thermoplastic resin composition of Comparative Example 1 that did not contain the impact modifier (C), although a tensile modulus of elasticity and gas barrier properties were improved, a breaking elongation percentage was significantly decreased, and thus, it was found that the thermoplastic resin composition of Comparative Example 1 is not suitable for intended use required to have flexibility. Moreover, even if the impact modifier (C) was mixed into the resin composition, a breaking elongation percentage could not be effectively improved if the impact modifier (C) was not dispersed in the semi-aromatic polyamide (B) (Comparative Examples 2 and 3). Furthermore, it was also found that, even if the impact modifier (C) was dispersed in the semi-aromatic polyamide (B), if the molar ratio between diamine units and dicarboxylic acid units in the semi-aromatic polyamide (B) was out of the predetermined range, or if the mixed ratio of the impact modifier (C) was out of the predetermined range, the melt viscosity of the resin composition (D) comprising the semi-aromatic polyamide (B) and the impact modifier (C) became too high, and moldability was thereby reduced (Comparative Examples 4 and 5).

Since the thermoplastic resin composition of the present invention and a molded body comprising the same are excellent in terms of flexibility and gas barrier properties, they are preferably used as a fuel transportation piping material, a fuel storage container, and the like. In particular, they are preferably used as materials for a fuel tube, a fuel pipe, a fuel hose, or a connector.

The invention claimed is:

1. A thermoplastic resin composition comprising an aliphatic polyamide (A), a semi-aromatic polyamide (B), and an impact modifier (C), wherein at least a part of the impact modifier (C) is dispersed in the semi-aromatic polyamide (B), wherein
   the aliphatic polyamide (A) is at least one selected from the group consisting of: a polyamide (A1) comprising at least one of lactam-derived constituting units having 10 to 12 carbon atoms and aminocarboxylic acid-derived constituting units having 10 to 12 carbon atoms; and a polyamide (A2) comprising aliphatic diamine-derived constituting units having 6 to 12 carbon atoms and aliphatic dicarboxylic acid-derived constituting units having 10 to 12 carbon atoms,
   in the semi-aromatic polyamide (B), the molar ratio between diamine units and dicarboxylic acid units (the number of moles of diamine units/ the number of moles of dicarboxylic acid units) is in the range of 0.97 to 1.02,
   the mass ratio of the impact modifier (C) to the total mass of the semi-aromatic polyamide (B) and the impact modifier (C) is in the range of 6% to 15%, and
   the mass ratio of the impact modifier (C) dispersed in the semi-aromatic polyamide (B) to the total mass of the semi-aromatic polyamide (B) and the impact modifier (C) is in the range of 6% to 15%.

2. The thermoplastic resin composition according to claim 1, wherein the mass ratio between the aliphatic polyamide (A) and the semi-aromatic polyamide (B) (the mass of the aliphatic polyamide (A):the mass of the semi-aromatic polyamide (B)) is in the range of 15:85 to 85:15.

3. The thermoplastic resin composition according to claim 1, wherein the semi-aromatic polyamide (B) is a polyamide comprising diamine constituting units containing 70 mol % or more of diamine constituting units derived from m-xylenediamine, and dicarboxylic acid units containing 70 mol % or more of dicarboxylic acid units derived from am-straight chain aliphatic dicarboxylic acid having 4 to 8 carbon atoms.

4. The thermoplastic resin composition according to claim 1, wherein the aliphatic polyamide (A) is one or more selected from the group consisting of polyamide 11, polyamide 12, polyamide 10,10, polyamide 10,12, polyamide 6,11 and polyamide 6,12.

5. The thermoplastic resin composition according to claim 1, wherein the impact modifier (C) is modified by acid.

6. The thermoplastic resin composition according to claim 1, wherein the ratio of the weight of the impact modifier (C) dispersed in the semi-aromatic polyamide (B) (W(C, B)) to the weight of the impact modifier (C) dispersed in the aliphatic polyamide (A) (W(C, A)), (W(C, B)/W(C, A)), is greater than the ratio of the weight of the semi-aromatic polyamide (B) (W(B)) to the weight of the aliphatic polyamide (A) (W(A)), (W(B)/W(A)).

7. The thermoplastic resin composition according to claim 1, which is obtained by melt-kneading the aliphatic polyamide (A) and a resin composition (D) that has been obtained by previously melt-kneading the semi-aromatic polyamide (B) and the impact modifier (C).

8. The thermoplastic resin composition according to claim 7, wherein the melt viscosity of the resin composition (D) at 260° C. at a shear rate of 100/s is in the range of 50 to 2000 Pa·s.

9. A molded body comprising the thermoplastic resin composition according to claim 1.

10. The molded body according to claim 9, which is a hollow molded body, a film-like molded body, or a fiber.

11. The molded body according to claim 10, wherein the hollow molded body is a fuel tube, a fuel pipe, a fuel hose, or a connector.

* * * * *